United States Patent [19]
Vincent

[11] 4,109,549
[45] Aug. 29, 1978

[54] DYNAMIC BALANCER FOR ROTATING BODIES AND METHOD OF MANUFACTURING SAME

[76] Inventor: Raymond A. Vincent, 9307 Marion Crescent, Detroit, Mich. 48239

[21] Appl. No.: 700,084

[22] Filed: Jun. 28, 1976

[51] Int. Cl.² .................. F16F 15/22; F16C 1/00; F16D 63/00; G01M 1/00
[52] U.S. Cl. .................... 74/573 F; 73/455; 64/1 V; 188/1 B; 51/169; 301/5 B; 244/75 A; 416/245 R
[58] Field of Search ............ 74/574, 573, 573 F; 73/455, 460; 64/1 V; 188/1 B, 1 BX, 218 A, 73.5; 192/30 V; 416/145, 245; 244/39, 75 A; 51/169; 301/5 B

[56] References Cited
U.S. PATENT DOCUMENTS

| | | | |
|---|---|---|---|
| 331,450 | 12/1885 | Rothe | 51/169 |
| 430,270 | 6/1890 | Cook | 301/5 B |
| 1,191,393 | 7/1916 | Bergstrom | 74/573 |
| 2,186,199 | 1/1940 | Martin | 74/573 X |
| 2,366,795 | 1/1945 | Lamoreaux | 416/145 |
| 2,576,105 | 11/1951 | Childs | 74/573 X |
| 2,687,918 | 8/1954 | Bell et al. | 301/5 BA |
| 2,765,858 | 10/1956 | Hardy | 416/245 |
| 2,958,165 | 11/1960 | Hofmann | 51/169 |
| 3,077,914 | 2/1963 | Fritts | 301/5 BA X |
| 3,316,021 | 4/1967 | Salathiel | 301/5 BA |
| 3,376,074 | 4/1968 | Whitlock | 301/5 BA |
| 3,462,198 | 8/1969 | Onufer | 301/5 BA |
| 3,703,341 | 11/1972 | Garofalo | 416/245 |
| 3,724,904 | 4/1973 | Nixon et al. | 301/5 BA |
| 3,772,831 | 11/1973 | Shaw | 51/169 X |
| 3,822,963 | 7/1974 | Goldberg | 416/245 |

FOREIGN PATENT DOCUMENTS

| | | | |
|---|---|---|---|
| 862,031 | 2/1941 | France | 416/245 |
| 572,052 | 9/1945 | United Kingdom | 416/245 |

Primary Examiner—Samuel Scott
Assistant Examiner—Don E. Ferrell
Attorney, Agent, or Firm—Krass & Young

[57] ABSTRACT

A rotating mechanism such as a model aircraft propeller shaft is balanced by a dynamic balancing apparatus comprising a disc rotating with the shaft and a stainless steel O-ring partly filled with mercury lodged in an undercut groove in the face of the disc. The method of manufacture involves placing the ring in the groove and compressing the ring to expand it radially into the undercut area.

6 Claims, 4 Drawing Figures

U.S. Patent   Aug. 29, 1978   4,109,549
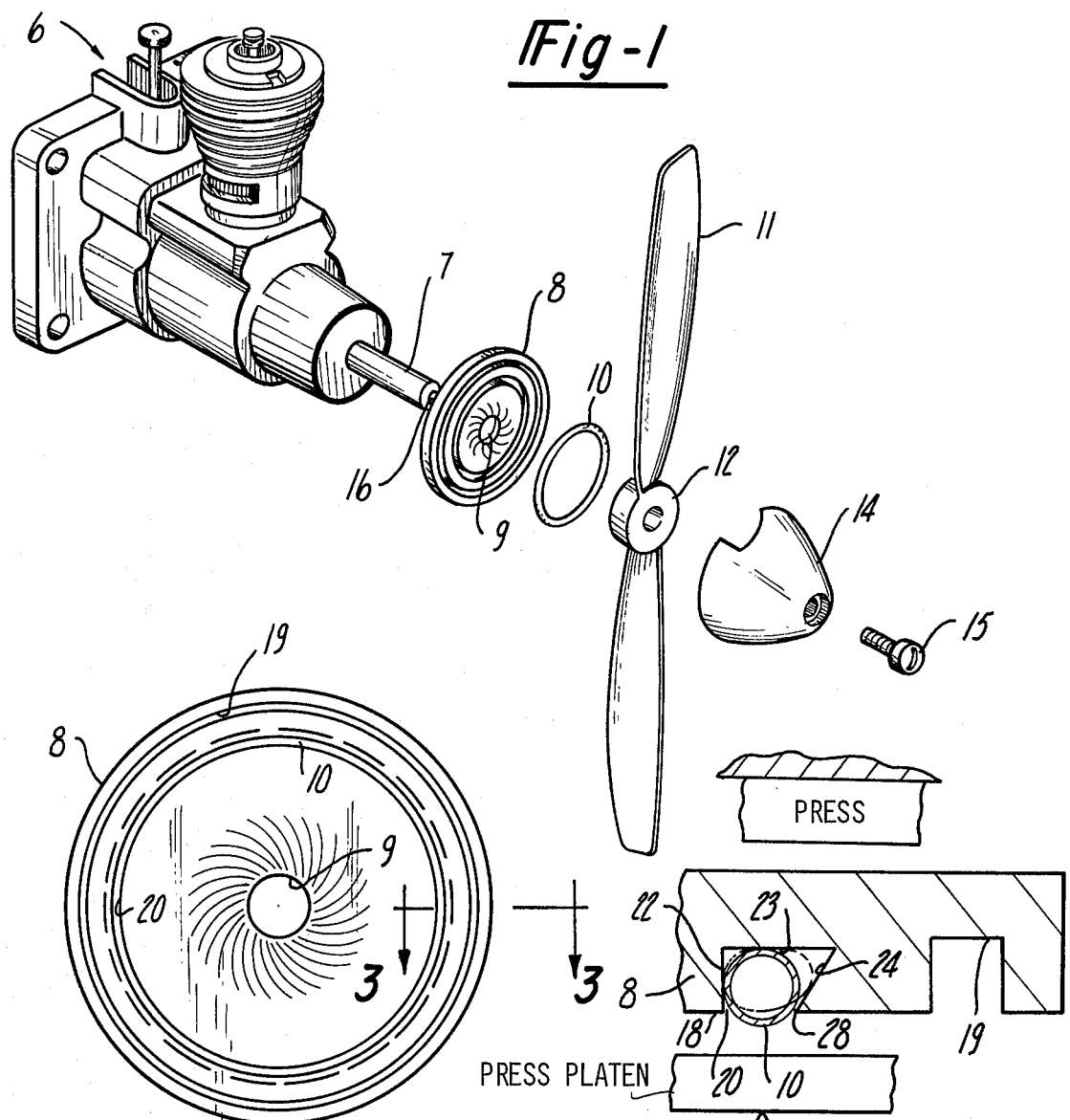

DYNAMIC BALANCER FOR ROTATING BODIES AND METHOD OF MANUFACTURING SAME

INTRODUCTION

My invention relates to an improved balancing device for rotating machinery which device includes a metal O-ring partially filled with a heavy fluid material, and to a method for manufacturing the device.

BACKGROUND OF THE INVENTION

Model aircraft ordinarily are propelled by small internal combustion engines driving propellers. Because of the scale of the device and because of its light construction it is important that vibrational stresses on the fuselage of the model airplane be minimized or prevented. Unbalances in the engine propeller combination set up vibrations which may be destructive. In addition, unbalanced conditions dissipate energy which would otherwise go toward the propulsion of the aircraft. My invention is directed to minimizing or eliminating such vibrations with little added weight in model aircraft and various other installations.

BRIEF SUMMARY OF THE INVENTION

I have conceived of embodying a known principle of balancing in a compact and very lightweight structure well suited for use in the engine-propeller combination of a model aircraft, as well as other small motor driven rotating assemblies.

My invention uses the principle of achieving balance of a rotating structure by the automatic distribution of a heavy fluid material, preferably mercury, in a closed toroidal housing or annular tube which rotates with the shaft or rotating assembly.

Applications of this principle have been known, for example, as disclosed in U.S. Pat. No. 2,687,918 to Bell et al issued Aug. 31, 1954. However, my invention relates to novel and improved structure which makes feasible the incorporation of such a balancer into a small lightweight structure such as a model aircraft engine-propeller combination.

The principal objects of my invention are to balance small rotating assemblies and to provide an improved balancer structure which is easily fabricated and assembled into small rotating machinery. It is a further object of the invention to provide a balancer structure which is compact, lightweight, durable, and relatively inexpensive. Briefly, I accomplish these objectives by partially filling a metal O-ring with mercury, and placing the ring in a light metal support having an undercut groove formed therein. The ring diameter is made slightly greater than the groove depth such that the ring may be radially expanded into the undercut by means of a pressing operation.

The nature of my invention and its advantages will be clear to those skilled in the art from the succeeding detailed description of the preferred embodiment of the invention and the accompanying drawings thereof.

BRIEF DESCRIPTION OF THE DRAWINGS

FIG. 1 is an exploded isometric view of a model aircraft propulsion plant;

FIG. 2 is a face view of a balancing disc;

FIG. 3 is an enlarged transverse section of a portion of the disc taken on the plane indicating by the line 3—3 in FIG. 2;

FIG. 4 is a view of a balancing tube taken along the axis thereof.

DETAILED DESCRIPTION OF THE SPECIFIC EMBODIMENT

Referring first to FIG. 1, this illustrates in disassembled or exploded fashion a model aircraft propulsion plant which comprises a single-cylinder reciprocating internal combustion engine 6. This engine drives a shaft 7 on which is mounted a support plate 8 of light metal such as aluminum, magnesium or suitable alloy which has a central bore 9 fitting closely onto the shaft. A balancing ring 10 is mounted on the plate 8, as will be described. A propeller 11 includes a hub 12 which likewise fits onto the shaft 7. A streamlined fairing or spinner 14 fits over the propeller hub and bears against plate 8, as will be described. This spinner is retained by a machine screw 15 which passes through a central opening in the nose of the spinner and is threaded into a bore 16 in the shaft 7, which extends to the nose of the spinner.

Screw 15 thus retains spinner 14, propeller 11, and plate 8 on the shaft. The plate may bear against a shoulder on the shaft.

Referring now to FIGS. 2 and 3, the plate 8 has two grooves in its forward face 18, an outer groove 19 and an inner groove 20. The outer groove 19 receives the margin of the spinner 14 when the assembly is completed to locate the rear edge of the spinner and complete the enclosure of the propeller hub. The groove 20 receives the balancing ring 10. As shown clearly in FIG. 3, the groove 20 is bounded by an inner face 22, a radial face 23 and an outer face 24. The outer face converges toward the axis of shaft 7 in the direction away from the face 23 to define an undercut or reverse bevel groove. This feature provides for very simple, light, and economical installation and retention of the balancing ring 10 as hereinafter set forth. The face of plate 8 is knurled about the hole 9 to create additional gripping between the disc and propeller hub 12.

Ring 10 is a sealed continuous thin-walled metal tube of a material which is not attacked by the flowable balancing substance contained within it. The preferred material for the tubing is stainless steel. The tubing, being made of metal, is of an elastic nature and substantially rigid. Metal rings of this nature, known as metal O-rings, are commercially available. Such commercial O-rings are gas-filled ordinarily. As shown most clearly in the sectional view of FIG. 4, the ring 10 employed in my invention is partially filled with a high-density flowable material, which is preferably mercury. The flowable material 26 fills preferably from $\frac{1}{3}$ to $\frac{1}{2}$ of the ring. It is vital that the mercury not completely fill the ring, since the operation of the balancer depends upon the free shifting of the mercury around the ring in response to the forces caused by the unbalance of the rotating assembly.

To summarize, the preferred balancing ring is a welded stainless steel ring filled with mercury. It will be apparent, however, that other reasonably dense materials which can flow under the influence of force might be used; as, for example, oil containing shot or other particles. A dry powdered material such as powdered tungsten might also be employed.

The preferred method of manufacture for the ring 10 and support plate 8 is as follows. The ring 10 is extruded or otherwise formed of stainless steel as a straight length, then bent into the ring shape. The ring, ends open, is filled to the desired extent with mercury. The ends are joined and welded to seal in the mercury. Any weld flash is trimmed.

Groove 20 has the radially outermost face 24 undercut as shown in FIG. 3. The depth of the groove 20 is made slightly less than the diameter of a cross section of the ring 10. However, the overall diameter of the groove 20 is such that the ring 10 drops cleanly and easily into place.

The combination of ring 10 and plate 8 is then placed in a suitable press and ring 10 is compressed to the extent of the difference between the depth of groove 20 and the original cross sectional diameter of ring 10. This compression flattens the ring and expands it radially into the undercut area adjacent face 24. The ring is thus locked into place. The support plate containing ring 10 may then be assembled with the aircraft engine by slipping plate 8 over the engine shaft, and assembly propeller 11, spinner 14 and screw 15 in the manner shown in FIG. 1.

With the apparatus at rest the mercury will adopt a position within the lower half of the ring 10. When the shaft is rotated by the engine, the mercury tends to fill the radially outer portion of the toroid under the influence of centrifugal force. This even distribution is varied, however, by response of the mercury to transverse vibration so that the mercury automatically assumes an uneven distribution acting to cancel or counteract the unbalance of the remainder of the rotating assembly. This phenomenon is known and need not be explained here.

It will be seen that the structure of the balancer 8, 10 described herein is particularly suited to the peculiar installation requirements of a small model aircraft propulsion equipment. It is compact, light in weight, and inexpensive. I believe, however, that the unique advantage of my invention lies in the use off a small, welded steel O-ring as the container for the mercury as well as the compression assembly thereof with the support member as described above. My invention can be used to advantage in small motor applications other than model aircraft engines; for example, in balancing the turbine or blower fan of a forced air furnace or air conditioning system.

I have concluded as to dimensions, that if the ring 10 is 1½ inches (38 mm) in diameter, the section diameter of the tubing should be approximately ⅛ inch (3 mm). If the ring has an overall diameter of 8 inches (200 mm) the tubing should be approximately 3/16 inch or about 4.5 mm section diameter. The 1½ inch diameter ring is admirably suited for model aircraft installations.

The plate 8 and propeller 12 may be suitably splined or keyed to the shaft 7 if desired or deemed necessary (not illustrated).

It should be apparent to those skilled in the art that the balancing arrangement shown and described is particularly suited to achieve the objects of balancing a small, lightweight assembly.

The embodiments of the invention in which an exclusive property or privilege is claimed are defined as follows:

1. A balancer mechanism for dynamically balancing a motor-driven rotatable assembly comprising, in combination, a body adapted to be rotated about an axis of rotation, the body having a face generally radial with respect to the said axis and having a circular shoulder on the face coaxial with the said axis in the direction away from the face so that the shoulder and the adjacent area of the face define an undercut annular recess adapted for positive retention of a slightly radially expanded metal ring therein; a hollow substantially rigid but slightly radially expanded ring lodged in the said recess bearing against the said face and shoulder, the ring defining a closed toroidal cavity, the shoulder having a depth of slightly less than the sectional diameter of the ring before said radial expansion; and a flowable material of substantial density contained within the said cavity, the volume of the material being within the range of approximately one-third to approximately one-half of the volume of the cavity so that the ring and flowable material are effective to counteract unbalance of the assembly during rotation thereof.

2. A rotatable assembly as defined in claim 1 in which the said body is a plate and including also a shaft, the plate being fixedly mounted on the shaft; a propeller fixedly mounted on the shaft adjacent to the plate; and a propeller spinner mounted on the shaft enclosing the hub portion of the propeller and engaging the plate, the plate defining a shoulder concentric with the said axis adapted to receive the periphery of the spinner.

3. An assembly as defined in claim 1 in which the shaft is the output shaft of a reciprocating engine adapted for propulsion of model aircraft.

4. An assembly as defined in claim 1 in which the said ring is composed substantially of stainless steel and the flowable material is mercury.

5. A method of manufacturing a dynamic balancer comprising the steps of: fabricating a closed hollow ring of expandable metal which is partially filled with a high density fluid such as mercury; fabricating a support member for the ring and of such design as to be rotatable with a motor-driven rotatable body to be balanced; forming in said member a groove which is undercut at the radially outward face thereof, which is of an overall width and diameter to closely receive the ring therein, but which is of a depth slightly less than the sectional diameter of the ring; placing the ring in the groove; and thereafter compressing the ring to radially expand the ring into the undercut groove area to lock the ring and support member together.

6. A method of balancing a rotatable body comprising the steps of: fabricating a closed, hollow, welded steel ring which is partially filled with mercury; fabricating a support member for receiving the ring within a groove which is undercut at the radially outward face thereof and supporting the ring in a position within said groove which is concentric with the center of rotation of said body; effecting an elastic interconnection between the ring and support member which results in slight permanent radial deformation of the ring thereby positioning a portion of the ring within said undercut to hold the ring in said position without further support; and rotating the body to distribute the mercury so as to produce a dynamic balance condition.

* * * * *